Patented Apr. 9, 1946

2,398,170

UNITED STATES PATENT OFFICE 2,398,170

COUPLING DEVICE FOR CONNECTING PIPES OR CONDUITS

Stanley Garth Williams-Foxcroft, Woodlands, Kemsing, England

Application February 7, 1944, Serial No. 521,418
In Great Britain June 13, 1942

1 Claim. (Cl. 284—19)

This invention relates to coupling devices for connecting pipes or conduits for conveying fluid under pressure of the kind which are self-sealing when the connection is broken so as to prevent any loss of fluid from the system, and comprising two coupling parts each formed as a socket and each having a laterally apertured sleeve member therein, and a coupling nut for connecting the parts together so that the lateral apertures in the sleeve members are put into communication through a common passage or conduit, means being provided for preventing the trapping of air in the liquid when the connection is made.

The object of the present invention is to devise improvements in the construction and arrangement of coupling devices of the character referred to which will enable them to deal when necessary with much higher pressures than is possible with existing forms of coupling.

The invention consists in a coupling device for connecting pipes or conduits comprising in combination one coupling part formed as a socket with a laterally apertured sleeve extension and a bush surrounding said sleeve and having a sealing groove on its inner face and such that the outer face of the bush and the end face of the sleeve extensions are flush and the apertures in the sleeve are sealed by the bush when the coupling is disconnected, a second coupling part comprising a socket with a laterally apertured sleeve therein movable or having a head movable axially against a spring and such that the end face of the spleeve or head is flush with the end face of the socket when the coupling is disconnected, an internal sealing groove in said last mentioned socket, and a coupling nut carried upon one socket and adapted to be screwed on to the other socket so that when the coupling is connected up the lateral openings in both sleeve members are in communication with the sealing groove which thus constitutes a conduit or passage through which fluid may pass from one coupling part to the other.

Further features of the invention will be apparent from the description given hereafter.

The accompanying drawing illustrates two modes of carrying out the invention.

Figure 1:
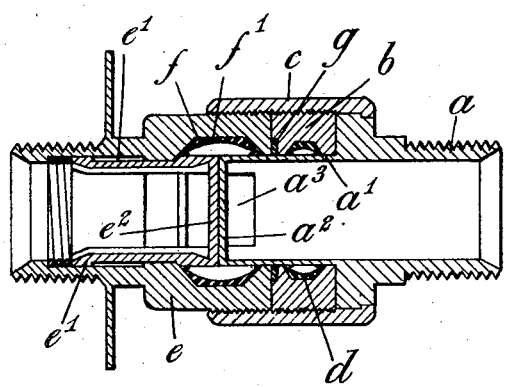
Figure 2:
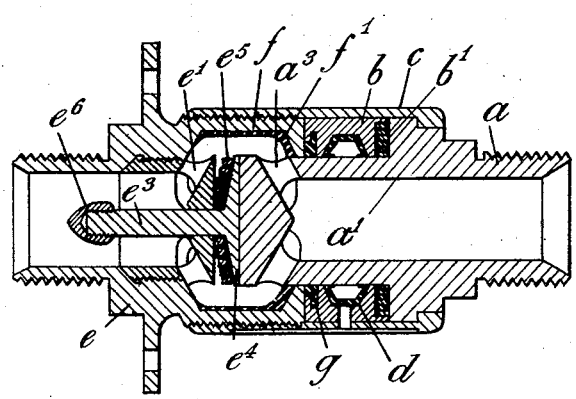

Figure 1 is a sectional elevation showing one form of coupling in accordance with the invention, and Figure 2 is a similar view showing a slightly modified form of coupling.

In carrying my invention into effect in one convenient manner I form my improved coupling with two coupling members, one of which comprises a socket $a$ having an extension $a'$ in the form of a sleeve, the outer end of which is closed as at $a^2$ while the sleeve is provided with a lateral opening or openings $a^3$ through which the fluid passes when the coupling is made. Surrounding the sleeves is a bush $b$, the outer surface of which is threaded to engage an internal thread in a coupling nut $c$ carried by the coupling member, the bush having a groove or channel surrounding the sleeve and carrying a rubber or other suitable sealing ring $d$, the width of which is sufficient to form an effective seal for the lateral openings $a^3$ in the sleeve when the latter are in register with the sealing recess in the bush.

The other coupling member is formed with a socket $e$ externally screw-threaded so as to be capable of engagement by the coupling nut $c$, and the end face of the socket $e$ is provided with recesses adapted to engage pins or projections upon the end face of the above mentioned bush (or vice versa) so that when the coupling nut $c$ is screwed on to the socket $e$ the bush $b$ will be moved back over the sleeve $a'$ in order to expose the lateral openings $a^3$ therein. The socket of the second coupling member $e$ contains a spring-pressed ported sleeve valve member $e'$, the end face of which is flat and closed as at $e^2$ and corresponds with the end face $a^2$ of the sleeve of the first coupling member $a$. The socket $e$ is provided with an internal sealing groove $f$ having a rubber or other sealing ring $f'$ therein, the groove forming a common conduit with which the openings of the two sleeve member $a'e'$ communicate when the coupling is connected, as shown in Figure 1, and being of sufficient extent to pass the full bore volume of fluid from one coupling member to the other. The arrangement is such that when the coupling members are disconnected the outer surface $a^2$ of the sleeve $a'$ is flush with the end surface of the bush $b$ in the first coupling member, while the coupling nut is in its fully withdrawn position and at the same time the end surface of the spring-pressed valve member $e'$ in the second coupling member is flush with the end surface of the socket $e$ of such member. In this condition the apertures in the sleeve $a'$ and valve member $e'$ are sealed by their respective sealing recesses. When now the coupling members are brought together for connection the flush surfaces meet so that air is completely excluded and the coupling nut is screwed home, the apertures in the respective members are unsealed and are brought into register with the groove $f$ in the second socket member so that a full bore passage for the fluid exists from one coupling part to the other.

In the construction shown in Figure 2, the coupling is very similar to that shown in Figure 1, and embodies two coupling sockets $a$ and $e$. The socket $a$ has the apertured sleeve extension $a'$ with the lateral openings $a^3$, and also carries the coupling nut $c$ within which is the bush $b$ having a sealing groove with sealing ring $d$ therein similar to that shown in Figure 1. In this case, however, the bush $b$, instead of being externally threaded for engagement with the coupling nut, is simply slidable therein against the action of the spring $b'$, as the coupling nut is screwed on to the socket $e$.

The socket $e$ is provided with an internal sealing groove $f$ (having a rubber or other sealing ring $f'$ therein) similar to that described with reference to Figure 1 and fulfilling the same function. The internal valve arrangement of the socket $e$ differs somewhat from that shown in Figure 1, inasmuch as in this case the ported sleeve $e'$ is screwed into the socket $e$ and slidably carries a spindle $e^3$ having a head $e^4$ designed to be flush with the outer surface of the socket $e$ when the parts are uncoupled and controlled by a spring $e^5$, the outward movement of the spindle under the influence of the spring $e^5$ being limited by the nut $e^6$ which may be substantially streamlined or formed so as not to interfere with the flow of the fluid through the coupling.

The operation of the coupling is identical with that of the coupling shown in Figure 1, and need not, therefore, be further described.

In either modification of the invention I prefer to provide a packing washer $g$ in one or other of the flush faces to prevent leakage when the parts are being coupled or uncoupled.

I claim:

A coupling device for connecting pipes or conduits comprising in combination one coupling part formed as a socket with a laterally apertured sleeve extension and a bush surrounding said sleeve extension and having a sealing groove on its inner face so disposed that when the outer face of the bush and the end face of the sleeve extension are flush the apertures in the sleeve extension are sealed by the bush, a second coupling part comprising a socket with a laterally apertured sleeve therein movable axially against a spring and such that the end face of the sleeve is flush with the end face of the socket when the coupling is disconnected, an internal sealing groove in said last mentioned socket, and a coupling nut carried upon the first mentioned socket and adapted to be screwed on to the second mentioned socket so that when the coupling is connected up the lateral openings in both the sleeve and sleeve extension are in communication with the internal sealing groove which thus constitutes a conduit or passage through which fluid may pass from one coupling part to the other, said bush having external threads fitting the threads of said coupling nut, interengaging members on said bush and said second mentioned socket whereby turning movement of the second mentioned socket with relation to the coupling nut is transmitted to said bush.

STANLEY GARTH WILLIAMS-FOXCROFT.